US011296377B2

(12) United States Patent
Narbonne et al.

(10) Patent No.: US 11,296,377 B2
(45) Date of Patent: Apr. 5, 2022

(54) COVER FOR AN ELECTROCHEMICAL CELL WITH ENHANCED HEAT CONDUCTION

(71) Applicant: SAFT, Levallois-Perret (FR)

(72) Inventors: Alexandre Narbonne, Blanquefort (FR); Gerard Rigobert, Fargues St Hilaire (FR); Thierry Berlureau, Bordeaux (FR); Matthieu Leyko, Bordeaux (FR)

(73) Assignee: SAFT, Levallois-Perret (FR)

( * ) Notice: Subject to any disclaimer, the term of this patent is extended or adjusted under 35 U.S.C. 154(b) by 19 days.

(21) Appl. No.: 16/771,521

(22) PCT Filed: Dec. 21, 2018

(86) PCT No.: PCT/EP2018/086711
§ 371 (c)(1),
(2) Date: Jun. 10, 2020

(87) PCT Pub. No.: WO2019/129734
PCT Pub. Date: Jul. 4, 2019

(65) Prior Publication Data
US 2021/0218095 A1 Jul. 15, 2021

(30) Foreign Application Priority Data

Dec. 27, 2017 (FR) ..................................... 1763248

(51) Int. Cl.
*H01M 50/152* (2021.01)
*H01M 10/613* (2014.01)
*H01M 10/643* (2014.01)
*H01M 10/647* (2014.01)
*H01M 10/6553* (2014.01)
*H01M 50/531* (2021.01)
(Continued)

(52) U.S. Cl.
CPC ..... *H01M 50/152* (2021.01); *H01M 10/0525* (2013.01); *H01M 10/613* (2015.04);
(Continued)

(58) Field of Classification Search
CPC .......... H01M 50/152; H01M 10/0525; H01M 10/613; H01M 10/643; H01M 10/647;
(Continued)

(56) References Cited

U.S. PATENT DOCUMENTS 6,013,388 A 1/2000 Stadnick
9,805,877 B2 * 10/2017 Khakhalev .......... H01M 4/0471
(Continued)

FOREIGN PATENT DOCUMENTS

CN 102867936 A 1/2013
EP 2 101 336 A1 9/2009

OTHER PUBLICATIONS

International Search Report for PCT/EP2018/086711 dated Mar. 29, 2019 [PCT/ISA/210].
(Continued)

*Primary Examiner* — Stewart A Fraser
(74) *Attorney, Agent, or Firm* — Sughrue Mion, PLLC

(57) ABSTRACT

The invention relates to an electrochemical element (1) comprising: a) a container (2) comprising an opening allowing the introduction of at least one electrochemical beam (7); and b) a closing part (3) for closing said container, comprising: i) at least one flat inner surface (4a, 4b, 4c) which is oriented towards the inside of the container and can be directly electrically connected to a current collector (6), ii) at least one flat outer surface (5a, 5b, 5c) which is oriented towards the outside of the container and can act as a terminal of the electrochemical element, and iii) at least one wall (8a, 8b, 8c) connecting said at least one flat inner surface to said at least one flat outer surface, said wall forming an angle of between 70 and 120° in relation to one of the two flat surfaces. The closing part of the container allows heat dissipation to be improved in the direction of the longitudinal axis of the element.

18 Claims, 5 Drawing Sheets

(51) Int. Cl.
*H01M 50/56* (2021.01)
*H01M 50/166* (2021.01)
*H01M 10/0525* (2010.01)
*H01M 10/6556* (2014.01)
*H01M 10/6567* (2014.01)

(52) U.S. Cl.
CPC ....... *H01M 10/643* (2015.04); *H01M 10/647* (2015.04); *H01M 10/6553* (2015.04); *H01M 10/6556* (2015.04); *H01M 10/6567* (2015.04); *H01M 50/166* (2021.01); *H01M 50/531* (2021.01); *H01M 50/56* (2021.01)

(58) Field of Classification Search
CPC ........... H01M 10/6553; H01M 50/166; H01M 50/531; H01M 50/56
See application file for complete search history.

(56) References Cited

U.S. PATENT DOCUMENTS

| | | |
|---|---|---|
| 2004/0131932 A1 | 7/2004 | Hamada et al. |
| 2006/0203429 A1 | 9/2006 | Thrap et al. |
| 2014/0045041 A1* | 2/2014 | Kim ................. H01M 10/0431 429/163 |
| 2014/0186692 A1* | 7/2014 | Kim ................. H01M 10/0431 429/185 |
| 2015/0287965 A1* | 10/2015 | Kim ................. H01M 50/152 429/82 |

OTHER PUBLICATIONS

Written Opinion for PCT/EP2018/086711 dated Mar. 29, 2019 [PCT/ISA/237].

* cited by examiner

COVER FOR AN ELECTROCHEMICAL CELL WITH ENHANCED HEAT CONDUCTION

CROSS REFERENCE TO RELATED APPLICATIONS

This application is a National Stage of International Application No. PCT/EP2018/086711 filed Dec. 21, 2018, claiming priority based on France Patent Application No. 1763248 filed Dec. 27, 2017.

FIELD OF THE INVENTION

The technical field of the invention is that of the components used in the manufacture of an electrochemical cell, and in particular that of the covers used for closing the container of an electrochemical cell.

BACKGROUND OF THE INVENTION AND PRIOR ART

The terms "electrochemical cell" and "cell" will be used in what follows in an interchangeable manner.

The operation of an electrochemical cell results in an increase in temperature and discharge of heat into the ambient air. If this heat is not sufficiently dissipated by the ambient air, heating up of the cell may occur, which will degrade its lifetime. Many heat exchange devices which are separate from the cell and placed in contact therewith have been proposed to remove heat discharged therefrom. Devices using a heat transfer fluid circulating in contact with the wall of the container of the cell are, for example, disclosed in European patent applications EP-A-1,261,065 and EP-A-1,746,672.

European patent application EP-A-1,261,065 discloses a thermal regulation device used for controlling the temperature of electrochemical cells arranged in a battery module. This device consists of a thin-walled tube made of a flexible or rigid material (plastics and the like) which is wound in such a way that at least one wall of the tube is in contact with each cell. The tube is filled with a heat transfer fluid which acts as a heat sink absorbing the heat of the cells to cool them, or conversely as a heat source for heating the cells, if necessary. Each tube has an inlet port and an outlet port for allowing fluid to pass therethrough. A pump is provided for regulating the flow rate and pressure of the heat transfer fluid within the tube.

European patent application EP-A-1,746,672 discloses a flexible pouch comprising a plurality of partitions defining a path for the circulation of a heat-transfer fluid. The pouch is arranged in contact with the cell walls of a battery module. The presence of regions, providing breaks in the partitions allows a change in the direction of circulation of the heat transfer fluid. The heat transfer fluid thus makes a plurality of passages in contact with all of the cells. This has the advantage of improving heat dissipation.

The use of such devices, separate from the cells, has the drawback of increasing the bulk of the cells and therefore of the module containing them. It is in fact necessary to reserve a space around the cells in order to cause the tube or the pouch containing the heat-transfer fluid to pass therethrough. There is consequently a need for a device for removing heat from the cell that does not increase the space requirement of the cell or module.

SUMMARY OF THE INVENTION

To this End, the Invention Provides an Electrochemical Cell Comprising:
 a) a container having an opening for introducing at least one electrode plate group;
 b) a closure part for the container having:
  i) at least one inner planar surface directed towards the interior of the container and able to be directly connected electrically to a current collector,
  ii) at least one outer planar surface directed towards the outside of the container and capable of serving as a terminal of the electrochemical cell,
  iii) at least one partition connecting said at least one inner planar surface to said at least one outer planar surface, said partition forming an angle ranging from 70° to 120°, with respect to one of the two planar surfaces.

The electrochemical cell according to the invention is characterized by the presence of the closure part which improves the dissipation of heat in the longitudinal axis direction of the container of the cell. The closure part is arranged on the end of the container of the cell and makes it possible to obtain very high thermal conductivity. The end of the container of the cell is used as a heat dissipation surface for cooling the cell.

The use of the closure part makes it possible to use heat exchangers with very high heat exchange capacity per unit surface area. The invention enables the assembly of high-power or high-cycling-capacity cells as a module. It also enables the production of compact assemblies of electrochemical cells.

In one embodiment, the closure part comprises from one to twenty, preferably from four to ten inner planar surfaces.

In one embodiment, the closure part comprises a plurality of inner planar surfaces, which are evenly distributed over the surface of the closure part.

In one embodiment, the at least one inner planar surface has a circular sector shape when viewed in a direction normal to the inner planar surface.

In one embodiment, the at least one inner planar surface has a circular crown portion shape when viewed in a direction normal to the inner planar surface.

According to one embodiment, the at least one partition has a thickness and this thickness is suitable for the circulation of a heat-transfer fluid therethrough.

In one embodiment, the thickness of the partition is divided into a plurality of compartments and each compartment is adapted to circulate a heat transfer fluid therethrough.

In one embodiment, the at least one outer surface has a circular sector or circular crown portion shape when viewed in a direction normal to the outer planar surface.

According to one embodiment, the closure part comprises a central portion and a peripheral portion, the peripheral portion and the central portion each comprising an outer surface having a circular sector or circular crown portion shape when viewed in a direction normal to the outer planar surface, the peripheral portion and the central portion being separated by an inner planar surface.

According to one embodiment, the closure part further comprises a channel for the circulation of a heat-transfer fluid from the peripheral portion to the central portion or vice versa.

In one embodiment, the electrochemical cell is of the lithium-ion type.

In one embodiment, the contact area between the closure part for the container and the container defines a closure plane, which closure plane is perpendicular to the direction defined by the largest dimension of the container.

In one embodiment, one or more inner planar surfaces are electrically connected directly to a current collector of the electrodes of a given polarity of the electrode plate group.

In one embodiment, one of the terminals of the electrochemical cell is formed by the at least one outer planar surface of the closure part.

In one embodiment, the container has a cylindrical or prismatic format.

The invention also provides a method for producing an electrical connection between electrodes of an electrochemical cell and a current output terminal of the cell, said method comprising the steps of:
  providing a container,
  introducing an electrode plate group into the container,
  placing a closure part on the container, said closure part having:
    i) at least one inner planar surface directed toward the interior of the container and able to be directly connected electrically to a current collector of the electrochemical cell, and
    ii) at least one outer planar surface directed towards the outside of the container and capable of serving as a terminal of the electrochemical cell,
    iii) at least one partition connecting said at least one inner planar surface to said at least one outer planar surface, said partition forming an angle ranging from 70° to 120°, with respect to one of the two planar surfaces,
  producing an electrical connection between the at least one inner planar surface of the closure part and a current collector of the electrodes of a given polarity of the electrode plate group.

In one embodiment, the electrical connection is performed by laser welding.

BRIEF DESCRIPTION OF THE DRAWINGS

FIG. 3b shows a view of the closure part in the third embodiment according to the sectional plane defined by the direction A-A' of FIG. 3a.

FIG. 4b is an inner view of the closure part of FIG. 4a.

DETAILED DESCRIPTION OF EMBODIMENTS

Figure 1A:
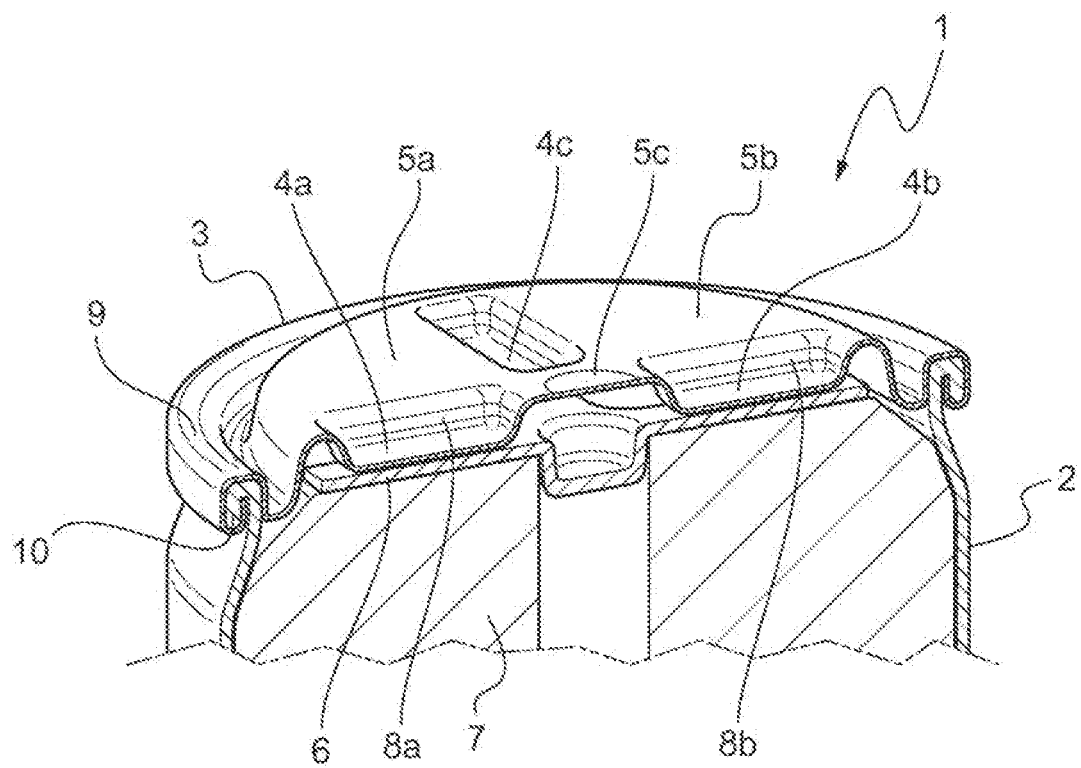
FIG. 1a shows a longitudinal sectional view of an end of the container of a cell sealed by the closure part according to a first embodiment. The longitudinal section passes through two inner planar surfaces located on a diameter of the closure part.

The electrochemical cell, according to the invention is characterized by the presence of a closure part having a particular geometry.

The closure part includes one or more inner planar surfaces directed toward the interior of the container. Each inner planar surface serves as a weld surface between the closure part and a current collector. The planar portion of each inner planar surface allows a weld to be made directly between the closure part and a current collector, i.e. without having to use an intermediate inner electrical connection piece. This weld is preferably laser-produced. The number of inner planar surfaces is not particularly limited and can range from 1 to 20, from 2 to 10 or from 4 to 6. According to the invention, the only welding surfaces between the closure part and the current collector consist of the at least one inner planar surface.

The closure part includes one or more outer planar surfaces directed toward the exterior of the container. The at least one outer planar surface is not in physical contact with a current collector. All of the outer planar surfaces constitute one of the two terminals of the electrochemical cell and acts as a cooling surface of the cell. All of the outer planar surfaces may serve as a support for an optional heat exchanger that further improves the cooling of the cell.

An inner planar surface is connected to an outer planar surface by a partition. The latter forms an angle ranging from 70 to 120°, preferably from 80 to 100°, preferably about 90° to one of the two planar surfaces.

The specific geometry of the closure part makes it possible both to collect the current coming from the electrodes and simultaneously to efficiently conduct heat to the outside, for example to a heat exchanger. The efficiency of heat dissipation by the closure part is proportional to the surface area through which the flow of heat passes. The sum of the surface areas of the surfaces perpendicular to the direction of the flow of heat is an indicator of the efficiency of heat dissipation. The sum of these surface areas is referred to below as the "surface area for heat conduction". This surface area can be increased, for example by increasing the thickness of the partitions, their number or length. In addition, the partitions may have a sufficiently large thickness to incorporate therein a heat exchanger.

The closure part can be produced by deep-drawing or cold-stamping a flat metal sheet, by molding or by three-dimensional printing. The closure part is generally the cover of an electrochemical cell, but it can be envisaged that it constitutes the bottom of the container, and would not be detachable from the container, as is a cover.

The format of the container of the cell is not particularly limited. It is generally of cylindrical or parallelepipedal format. However, other formats can be envisaged. The closure part will generally be disposed in a plane perpendicular to the direction defined by the largest dimension of the container. The container may be made of a metal material or an electrically insulating material, such as plastic, or a metal material covered with a sheet of electrically insulating material.

The closure part is well suited to dissipation of heat emitted by sealed cells, such as lithium-ion cells. These generate a large amount of energy when they operate under high current charging or discharging, as is the case in hybrid vehicles powered by internal combustion engine and an electric motor.

A first embodiment is described below with reference to FIGS. 1a and 1b. FIG. 1a shows a longitudinal sectional view of an end of the cylindrical container 2 of an electrochemical cell 1 sealed by a cylindrical closure part 3. The closure part 3 comprises four inner planar surfaces, three of which are shown 4a, 4b, 4c, and five outer planar surfaces, three of which are shown 5a, 5b, 5c. The four inner planar surfaces are evenly distributed over the closure part and form a cross. Each inner planar surface constitutes a weld surface with a current collector 6 arranged below the closure part. The current collector is electrically connected to the electrodes of the same polarity of the electrode plate group 7. The assembly formed by the outer planar surfaces forms a current output terminal. The inner planar surfaces 4a, 4b are connected to the outer planar surfaces 5a, 5b by partitions 8a, 8b. The alternation of inner planar surfaces and outer planar surfaces connected by partitions provides the closure part with a corrugated sheet appearance. The peripheral portion 9 of the closure part is crimped onto the bent end of the wall of the container 10 thereby sealing the container for the cell.

Figure 1B:
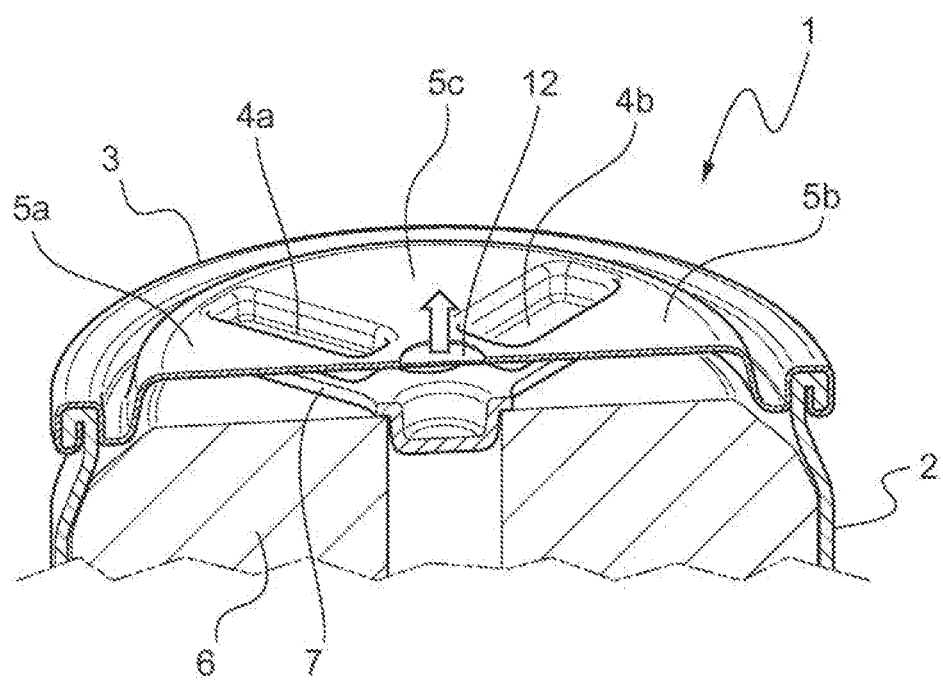
FIG. 1b shows a longitudinal sectional view of an end of the container of a cell sealed by the closure part according to the first embodiment. The longitudinal section passes through two outer planar surfaces located on a diameter of the closure part.

FIG. 1b shows a longitudinal sectional view of the end of the container 2 of the cell 1 closed by the closure part 3. The longitudinal section passes through two outer planar surfaces 5a, 5b located on a diameter of the closure part. This Figure shows that the current collector 6 has a cross shape that follows the direction along which the inner planar surfaces 4a, 4b extend. The outer planar surface 5c located at the center of the closure part can be recessed and the opening thus created can serve as a housing for a safety device such as a valve 12 for venting gas in the event of overpressure inside the container.

Figure 2A:
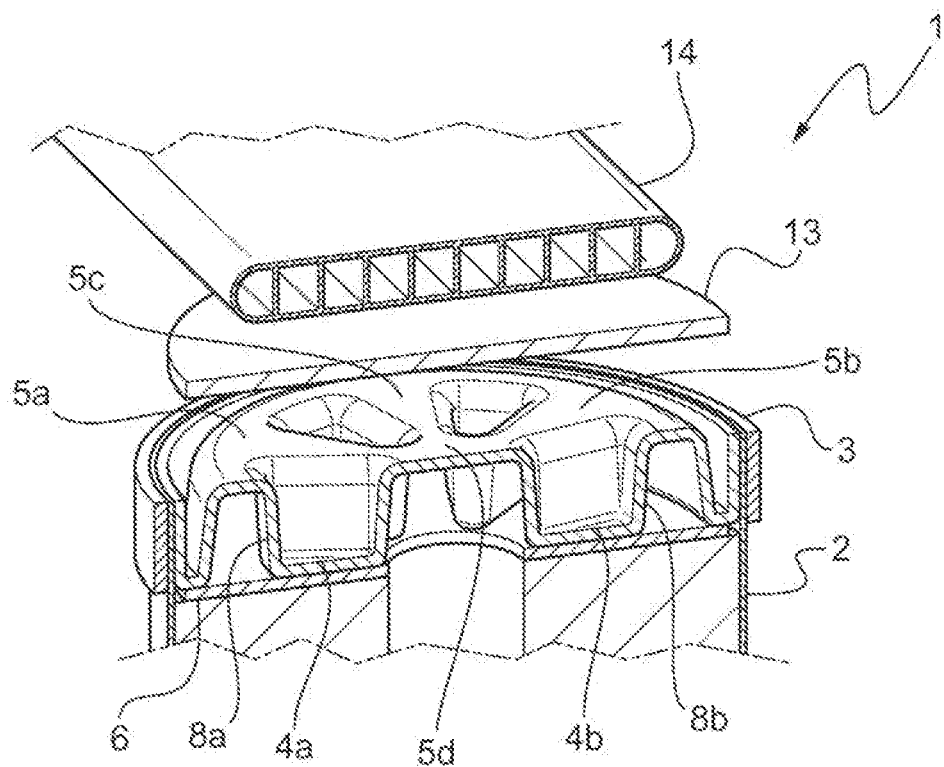
FIG. 2a shows a longitudinal sectional view of an end of the container of a cell sealed by the closure part according to a second embodiment. The section passes through two inner planar surfaces located on a diameter of the closure part. A heat exchanger is arranged on an electrical connection piece external to the cell, the latter resting on the closure part.

A second embodiment is described below with reference to FIGS. 2a and 2b. FIG. 2a shows a longitudinal sectional view of an end of the cylindrical container 2 of an electrochemical cell 1 sealed by a cylindrical closure part 3. The inner planar surfaces are six in number and are triangular-shaped. They are evenly distributed over the surface of the closure part. Only two inner planar surfaces 4a, 4b are visible. Each inner planar surface serves as a weld surface of the closure part to the current collector 6. Each inner planar surface is directly welded to the current collector. Outer planar surfaces 5a, 5b, 5c are located between the inner planar surfaces and at the center of the closure part 5d. They are not in physical contact with the current collector. They serve as a support for an external electrical connection piece 13. This piece serves as a support for a heat exchanger 14. The outer planar surfaces 5a, 5b, 5c, 5d are connected to the inner planar surfaces 4a, 4b by partitions 8a, 8b, 8c running substantially vertically.

Figure 2B:
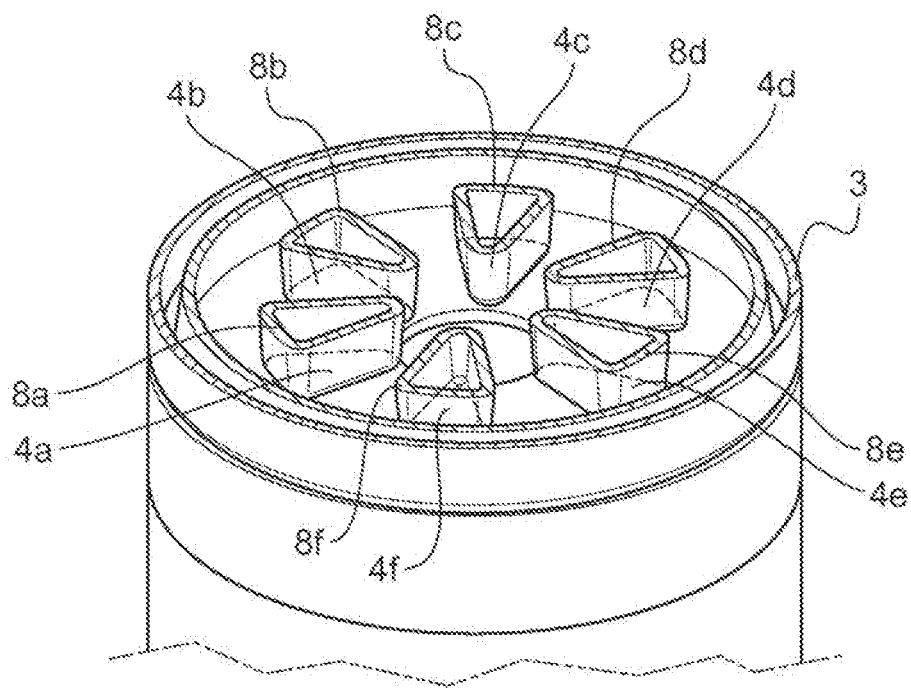
FIG. 2b shows a view of the closure part in the second embodiment according to a horizontal sectional plane passing through the thickness of the part.

FIG. 2b shows a view of a closure part 3 along a horizontal section plane passing through the thickness of the part. This Figure shows six sets 8a-8f of partitions arranged in a triangle. Each set of partitions connects an outer planar surface, not visible in FIG. 2b, to an inner planar surface 4a-4f. The boundaries of each inner planar surface are shown in dotted lines. As explained above, an improvement in heat dissipation is achieved by increasing the number of partitions, the thickness or the length thereof. In FIG. 2b, the surface area of the heat conduction surface is illustrated by cross-hatching.

Figure 3A:
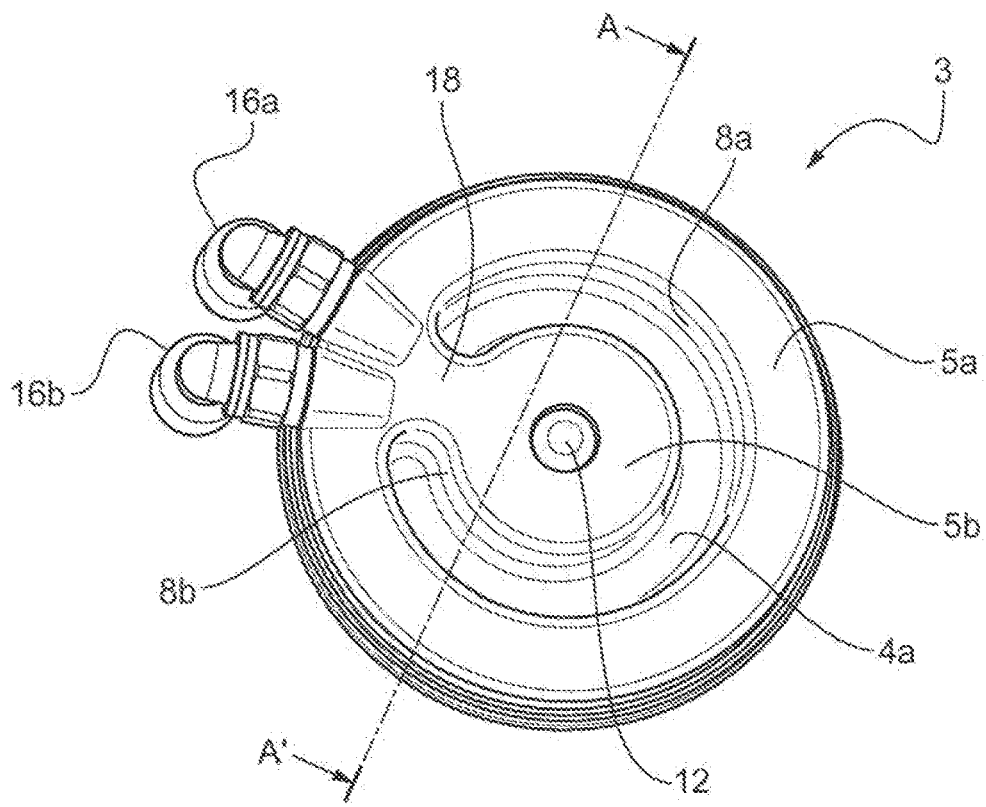
FIG. 3a shows a top view of a closure part in a third embodiment of the invention.

A third embodiment is described below with reference to FIGS. 3a to 3b. FIG. 3a shows a top view of a closure part 3 of circular shape. The closure part comprises a first outer surface 5a located on the peripheral portion of the closure part and a second outer surface 5b located on the central portion of the closure part. The two outer surfaces have a circular crown portion shape. They are separated by an inner surface 4a also having a circular crown portion shape. The first outer surface 5a is connected to the inner surface 4a by a partition 8a. The thickness of the partition 8a extends over the entire width of the first outer surface 5a. Also, the second outer surface 5b is connected to the inner surface 4a by a partition 8b. The thickness of the partition 8b extends over the entire width of the second outer surface 5b. The thickness of the partitions 8a, 8b is sufficient to allow the circulation of a heat transfer fluid therethrough. Two conduits 16a, 16b provide the inlet and outlet for the heat transfer fluid. A channel 18 allows the heat transfer fluid to flow from the peripheral portion to the central portion or vice versa. The closure part is provided at its center with a safety device 12.

Figure 3B:
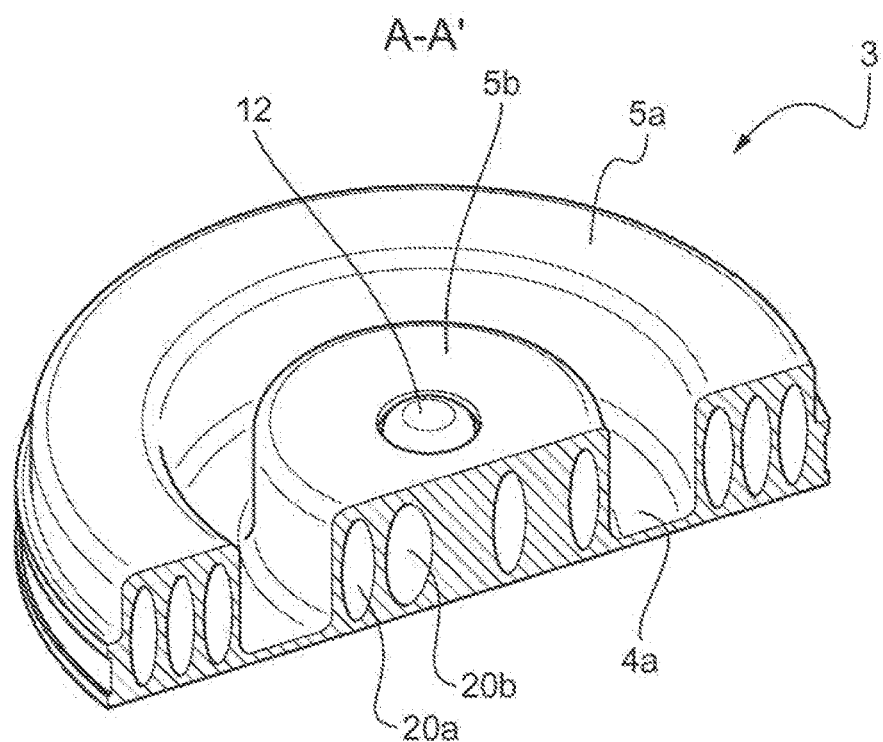

FIG. 3b is a view of the closure part 3 along a sectional plane passing through the axis A-A' of FIG. 3a. It shows that each partition 8 is subdivided into several compartments 20a, 20b. Each compartment is adapted to circulate a heat transfer fluid therethrough.

Figure 4A:
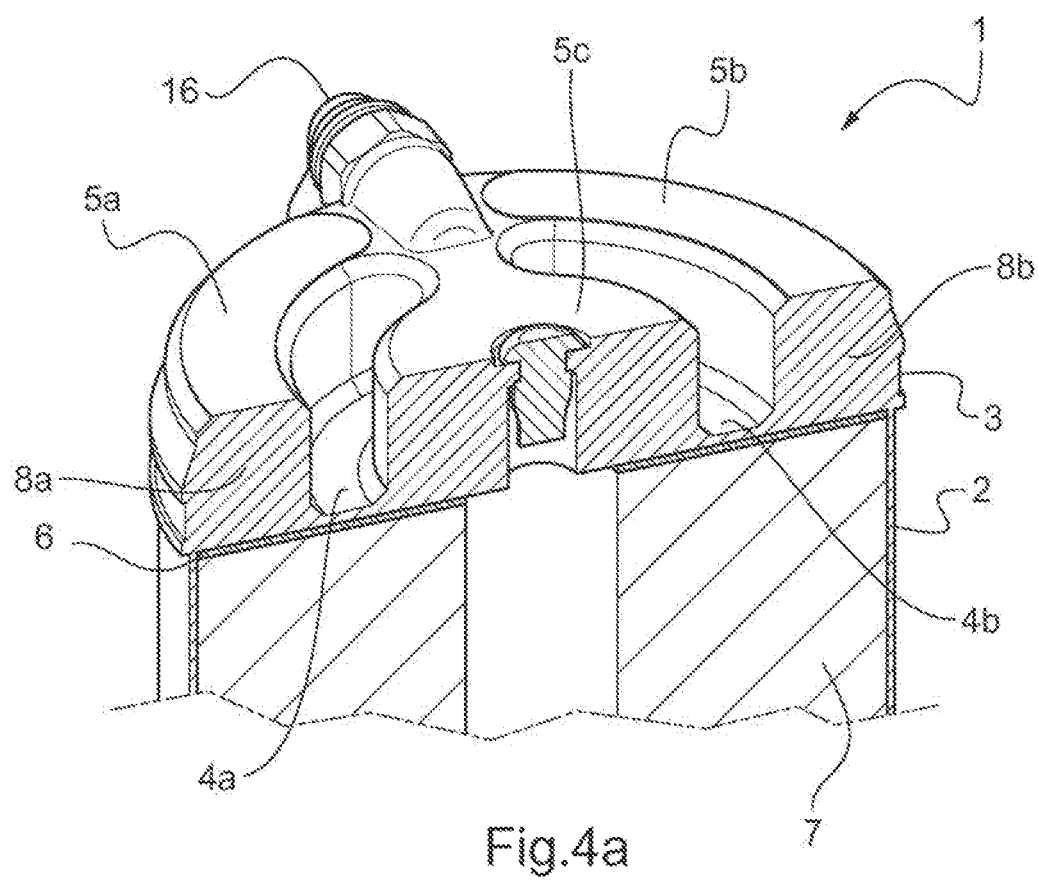
FIG. 4a shows an end of the container of a cell sealed by the closure part in a fourth embodiment.

A fourth embodiment is described below with reference to FIGS. 4a to 4b. In this embodiment, heat dissipation is further enhanced by an increase in the surface area of the heat conduction surface and a heat exchanger is integrated into the closure part. FIG. 4a shows a longitudinal sectional view of an end of the cylindrical container 2 of an electrochemical cell 1 sealed by a closure part 3. The number of inner planar surfaces is two, 4a, 4b. These are in the form of a circular crown portion. Each inner planar surface constitutes a weld surface with a current collector 6 arranged below the closure part. The current collector is electrically connected to the electrodes of the same polarity of the electrode plate group 7. FIG. 4a shows three outer planar surfaces 5a, 5b, 5c, the assembly of which serves as a terminal of the cell. The outer surface 5a is connected to the inner surface 4a by a partition 8a. The thickness of the partition 8a extends over the entire width of the outer surface 5a. Also, the outer surface 5b is connected to the inner surface 4b by a partition 8b. The thickness of the partition 8b extends over the entire width of the outer surface 5b. A conduit 16 allows a heat transfer fluid to be introduced.

The thickness of the partitions 8a and 8b is large enough to incorporate therein a heat exchanger. This exchanger is integrated into the lower portion of the closure part, as shown in FIG. 4b. Each partition is sub-divided into a plurality of compartments 20 for circulating a heat transfer fluid. A cover forming the upper portion of the closure part is superposed on the lower portion to form the closure part as shown in FIG. 4a.

EXAMPLES

Figure 5:
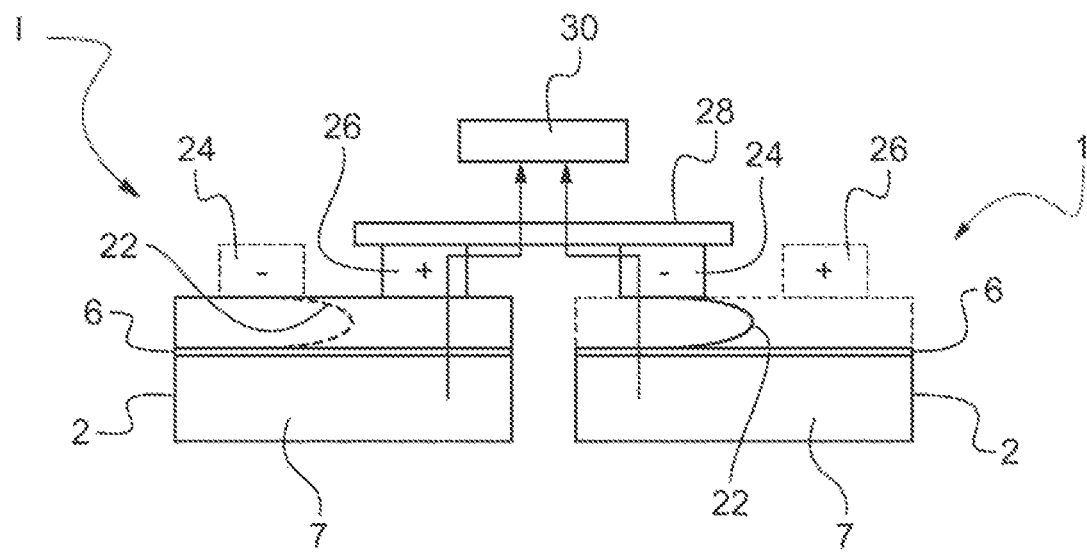
FIG. 5 is a diagrammatic representation of an electrical connection between two electrochemical cells of the prior art.

1 Thermal Resistance of the Chain of Mechanical Parts Connecting an Electrode Plate Group to a Heat Exchanger in the Case of Electrochemical Cells of the Prior Art:

The thermal resistance of the chain of mechanical parts connecting an electrode plate group to a heat exchanger in the case of electrochemical cells of the prior art was calculated. Calculation is based on the connection of two electrochemical cells of the prior art in a configuration as schematized in FIG. 5. Each cell 1 comprises an electrode plate group 7 inserted into a container 2. The ends of the strips of the electrodes protruding from the top of the electrode plate group are connected to a current collector 6.

The current collector is connected to an inner connection piece 22. The inner connection piece electrically connects the current collector to a current output terminal 24, 26. A metal strip or busbar 28, is used for the series connection of the two cells. The metal strip is in contact with a heat exchanger 30. Table 1 below indicates the parameters used for the calculation.

TABLE 1

| Characteristic | Unit | Aluminum container | Aluminum positive terminal | Metal busbar of copper | Copper negative terminal | Internal connection piece in copper |
|---|---|---|---|---|---|---|
| Thermal conductivity ($\lambda$) | W/(m · K) | 204 | 204 | 384 | 387 | 384 |
| Length (L) | mm | 15 | 7.8 | 33 | 14.6 | 60 |
| Surface area for heat conduction (A) | mm² | 119 | 134.3 | 54.0 | 75.4 | 14.4 |
| Thermal resistance (R)* | K · W⁻¹ | 0.62 | 0.28 | 1.59 | 0.50 | 10.85 |

*Thermal resistance R = L/($\lambda$ × A)

The average thermal resistance is (0.62+0.28+1.59+0.5+10.85)/2, equal to 6.93 K·W⁻¹.

Figure 6:
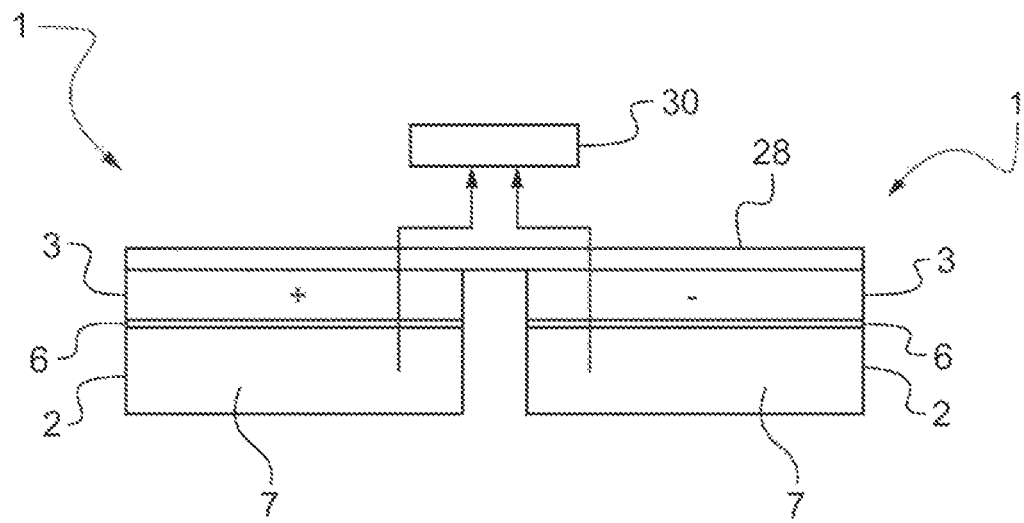
FIG. 6 is a diagrammatic representation of an electrical connection between two electrochemical cells according to the present invention.

2 Thermal Resistance of the Chain of Mechanical Parts Connecting an Electrode Plate Group to a Heat Exchanger in the Case of Electrochemical Cells According to the Invention:

The thermal resistance of the chain of mechanical parts connecting an electrode plate group to a heat exchanger in the case of electrochemical cells according to the invention was calculated. The calculation is based on the connection of two electrochemical cells in a configuration as schematized in FIG. 6; each cell 1 comprises an electrode plate group 7 inserted into a container 2. The ends of the strips of the electrodes protruding from the top of the electrode plate group are connected to a current collector 6. The current collector is directly welded to a cover 3 which is the closure part and whose outer planar surfaces form one of the two current output terminals of the cell. The two cells do not comprise an inner connection piece 22, unlike the configuration of FIG. 5. The at least one inner surface of the closure part replaces this inner connection piece. A metal strip or busbar 28 is provided for connecting the two cells in series. The metal strip is in contact with a heat exchanger 30. Table 2 below indicates the parameters used for the calculation.

TABLE 2

| Characteristic | Unit | Aluminum positive terminal | Metal busbar of copper | Aluminum negative terminal | Copper negative terminal |
|---|---|---|---|---|---|
| Thermal conductivity ($\lambda$) | W/(m · K) | 204 | 384 | 204 | 384 |
| Length (L) | mm | 6 | 33 | 6 | 6 |
| Surface area for heat conduction (A) | mm² | 555 | 54.0 | 555 | 555 |
| Thermal resistance (R) | K · W⁻¹ | 0.05 | 1.59 | 0.05 | 0.028 |

The average thermal resistance is (0.05+1, 59+0, 05)/2 equal to 0.85 K·W⁻¹ in the case of a negative aluminum terminal. It is 0.84 K·W⁻¹ in the case of a copper negative terminal. These two values are approximately 8 times lower than the value obtained for mounting the cells according to the prior art. The cell according to the invention thus considerably improves heat dissipation than a cell according to the prior art.

Figure 4B:
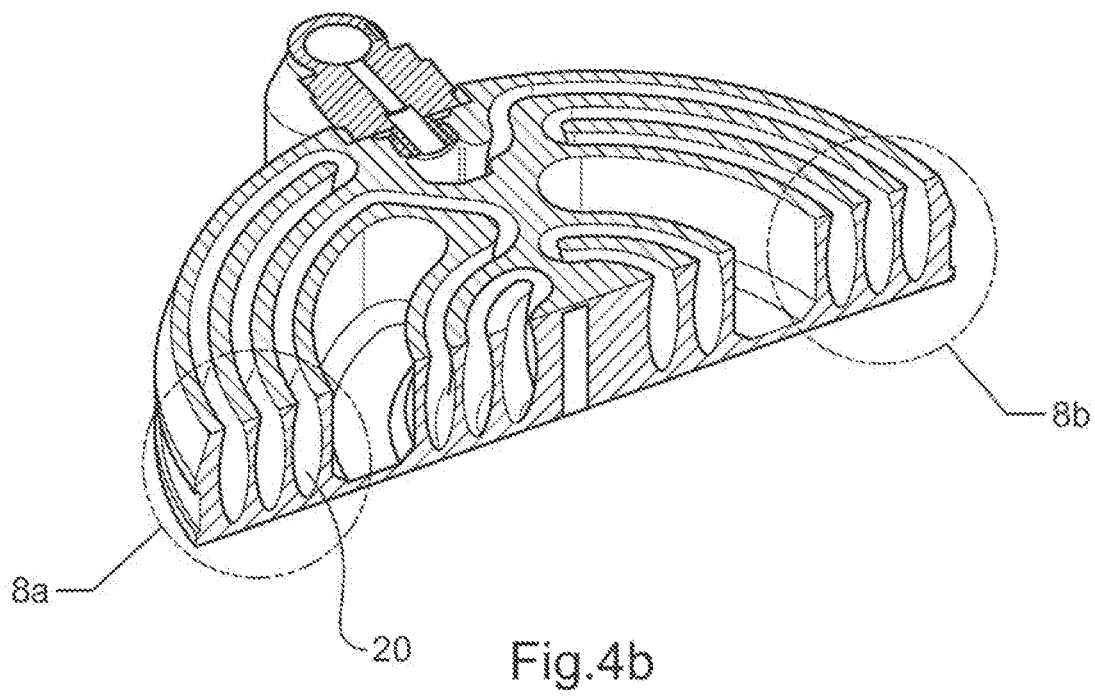

3) Thermal Resistance of an Electrochemical Cell According to the Embodiment Illustrated in FIGS. 4a and 4b:

The thermal resistance of an electrochemical cell comprising a closure part according to the embodiment illustrated in FIGS. 4a and 4b and the surface area of the heat conduction surface of which is 1490 mm² was estimated at 0.033 K·W⁻¹. Table 3 below indicates the parameters used for this evaluation.

TABLE 3

| Characteristic | Unit | Aluminum positive terminal |
|---|---|---|
| Thermal conductivity ($\lambda$) | W/(m · K) | 204 |
| Length (L) | mm | 1 |
| Surface area for heat conduction (A) | mm² | 1490 |
| Thermal resistance (R) | K · W⁻¹ | 0.0033 |

The thermal resistance obtained is 0.0033 K·W⁻¹, which is significantly lower than the value of 6.96 K·W⁻¹ for the prior art. Thus, thanks to this embodiment, a considerable reduction in thermal resistance between the electrode plate group and the heat exchanger can be further achieved.

The invention claimed is:

1. An electrochemical cell comprising:
   a) a container having an opening for introducing at least one electrode plate group;
   b) a closure part for the container having:
      i) at least one inner planar surface directed towards the interior of the container and able to be directly connected electrically to a current collector,
      ii) at least one outer planar surface directed towards the outside of the container and capable of serving as a terminal of the electrochemical cell,
      iii) at least one partition connecting said at least one inner planar surface to said at least one outer planar surface, said partition forming an angle ranging from 70° to 120°, with respect to one of the two planar surfaces.

2. The electrochemical cell according to claim 1, wherein thy: closure pa comprises from one to twenty inner planar surfaces.

3. The electrochemical cell according to claim 1, wherein the closure part comprises a plurality of inner planar surfaces, which are evenly distributed over the surface of the closure part.

4. The electrochemical cell according to claim 1, wherein said at least one inner planar surface has a circular sector shape when viewed in a direction normal to the inner planar surface.

5. The electrochemical cell according to claim 1, wherein said at least one inner planar surface has a circular crown portion shape when viewed in a direction normal to the inner planar surface.

6. The electrochemical cell according to claim 1, wherein said at least one partition has a thickness and this thickness is suitable for the circulation of a heat-transfer fluid therethrough.

7. The electrochemical cell according to claim 6, wherein the thickness of the partition is subdivided into several compartments and each compartment is adapted to the circulation of a heat-transfer fluid therethrough.

8. The electrochemical cell according to claim 1, wherein said at least one outer surface has a circular sector or circular crown portion shape when viewed in a direction normal to the outer planar surface.

9. The electrochemical cell according to claim 8, wherein said closure part comprises a central portion and a peripheral portion, the peripheral portion and the central portion each comprising an outer surface having a circular sector or circular crown portion shape when viewed in a direction normal to the outer planar surface, the peripheral portion and the central portion being separated by an inner planar surface.

10. The electrochemical cell according to claim 9, wherein said closure part further comprises a channel for circulating a heat-transfer fluid from the peripheral portion to the central portion or vice versa.

11. The electrochemical cell according to claim 1, of the lithium-ion type.

12. The electrochemical cell according to claim 1, wherein the contact area between the closure part for the container and the container defines a closure plane, which closure plane is perpendicular to the direction defined by the largest dimension of the container.

13. The electrochemical cell according to claim 1, in which one or more inner planar surfaces are electrically connected directly to a current collector of the electrodes of a given polarity of the electrode plate group.

14. The electrochemical cell according to claim 1, wherein one of the terminals of the electrochemical cell is constituted by the at least one outer planar surface of the closure part.

15. The electrochemical cell according to claim 1, in which the container is of cylindrical or prismatic format.

16. The electrochemical cell according to claim 1, wherein the closure part comprises from four to ten inner planar surfaces.

17. A method for producing an electrical connection between electrodes of an electrochemical cell and a current output terminal of the cell, said method comprising the steps of:
providing a container,
introducing an electrode plate group into the container,
placing a closure part on the container, said closure part having:
i) at least one inner planar surface directed toward the interior of the container and able to be directly connected electrically to a current collector of the electrochemical cell, and
ii) at least one outer planar surface directed towards the outside of the container and capable of serving as a terminal of the electrochemical cell,
iii) at least one partition connecting said at least one inner planar surface to said at least one outer planar surface, said partition forming an angle ranging from 70° to 120°, with respect to one of the two planar surfaces,
producing an electrical connection between the at least one inner planar surface of the closure part and a current collector of the electrodes of a given polarity of the electrode plate group.

18. The method according to claim 17, wherein the electrical connection is carried out by laser welding.

* * * * *